(12) United States Patent
Sivakumar et al.

(10) Patent No.: US 11,776,270 B2
(45) Date of Patent: Oct. 3, 2023

(54) TELECOMMUNICATION NETWORK MONITORING

(71) Applicant: INTERNATIONAL BUSINESS MACHINES CORPORATION, Armonk, NY (US)

(72) Inventors: Gandhi Sivakumar, Melbourne (AU); Kushal S. Patel, Pune (IN); Sarvesh S. Patel, Pune (IN); Luke Peter Macura, Lucas (AU)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 17/248,201

(22) Filed: Jan. 14, 2021

(65) Prior Publication Data

US 2022/0222471 A1    Jul. 14, 2022

(51) Int. Cl.
*G06V 20/40* (2022.01)
*H04N 21/61* (2011.01)
(Continued)

(52) U.S. Cl.
CPC .......... *G06V 20/47* (2022.01); *H04L 67/133* (2022.05); *H04N 21/25816* (2013.01); *H04N 21/6181* (2013.01); *H04N 21/633* (2013.01)

(58) Field of Classification Search
CPC ................ G06V 20/47; H04L 67/133; H04N 21/25816; H04N 21/6181; H04N 21/633
See application file for complete search history.

(56) References Cited

U.S. PATENT DOCUMENTS 11,099,944 B2 * 8/2021 Gokhale ............. G06F 11/1469
2010/0323723 A1   12/2010 Gerstenberger
(Continued)

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Jefferey F Harold
*Assistant Examiner* — Franklin S Andramuno
(74) *Attorney, Agent, or Firm* — Schmeiser, Olsen & Watts; Edward Wixted

(57) ABSTRACT

A method, system, and computer program product for monitoring a telecom network is provided. The method includes retrieving images associated with a transmission location of a telecom network. A communication channel is initialized for enabling transmission of a real time video stream comprising the images with respect to virtual network functions. The virtual network functions are enabled and a triggering signal of the virtual network functions is located. Image collector software and hardware components are activated for collecting the images for local cache storage and location and activation information is collected. Attributes of objects within the images are collected and detecting resulting obstruction characteristics associated with obstruction objects located within a coverage area of the telecom network are detected. The obstruction characteristics are mapped with login and disturbance patterns of the telecom network and an alternative transmission location within the telecom network is determined for providing improved transmission characteristics.

20 Claims, 10 Drawing Sheets

(51) Int. Cl.
  *H04L 67/133* (2022.01)
  *H04N 21/258* (2011.01)
  *H04N 21/633* (2011.01)

(56) References Cited

U.S. PATENT DOCUMENTS

2015/0097683 A1  4/2015  Sloo
2019/0357104 A1  11/2019  Onishi

OTHER PUBLICATIONS

Anonymous; Method and Apparatus for Cognitive Hazard Detection and Resistant for User Devices; IP.com; ICOM000255260D; Sep. 12, 2018; 3 pages.

Chandresakara, Rakhitha et al.; Sensing Line-of-Sight Obstructions in a Multipath Radio Environment; 17th Annual Research Symposium on Excellence in Research, Excelling a Nation; 2011; pp. 193-196.

ericsson.com; Optimizing Network Applications for 5G; https://www.ericsson.com/en/news/2017/4/optimizing-network-applications-for-5g; Retrieved from the Internet Jan. 7, 2021; 1 page.

Firyaguna, Fadhil et al.; Performance Evaluation of Scheduling in 5G-mmWave Networks under Human Blockage; https://arxiv.org/pdf/2007.13112v1.pdf; Jul. 26, 2020; 8 pages.

Fisher, Tim;5G Spectrum and Frequencies: Everything You Need to Know; https://www.lifewire.com/5g-spectrum-frequencies-4579825; Dec. 13, 2020; 7 pages.

Low, Cheriynn; How5G makes use of millimeter waves; https://www.engadget.com/2018-07-23-how-5g-makes-use-of-millimeter-waves.html Jul. 23, 2018; 14 pages.

Oguma, Yuta et al.; Implementation and Evaluation of Reactive Base Station Selection for Human Blockage in mmWave Communications; 2015 21st Asia-Pacific Conference on Communications; Oct. 16, 2015; pp. 199-203.

Wikipedia; Extremely high frequency; https://en.wikipedia.org/wiki/Extremely_high_frequency; retrieved from the Internet Jan. 13, 2021; 7 pages.

Wu, Tin-Yu; Interference Reduction by Millimeter Wave Technology for 5G-Based Green Communications; IEEE Access—Special Section on Green Communications and Networking for 5G Wireless, vol. 4, 2016; Aug. 26, 2016; pp. 10228-10234.

\* cited by examiner

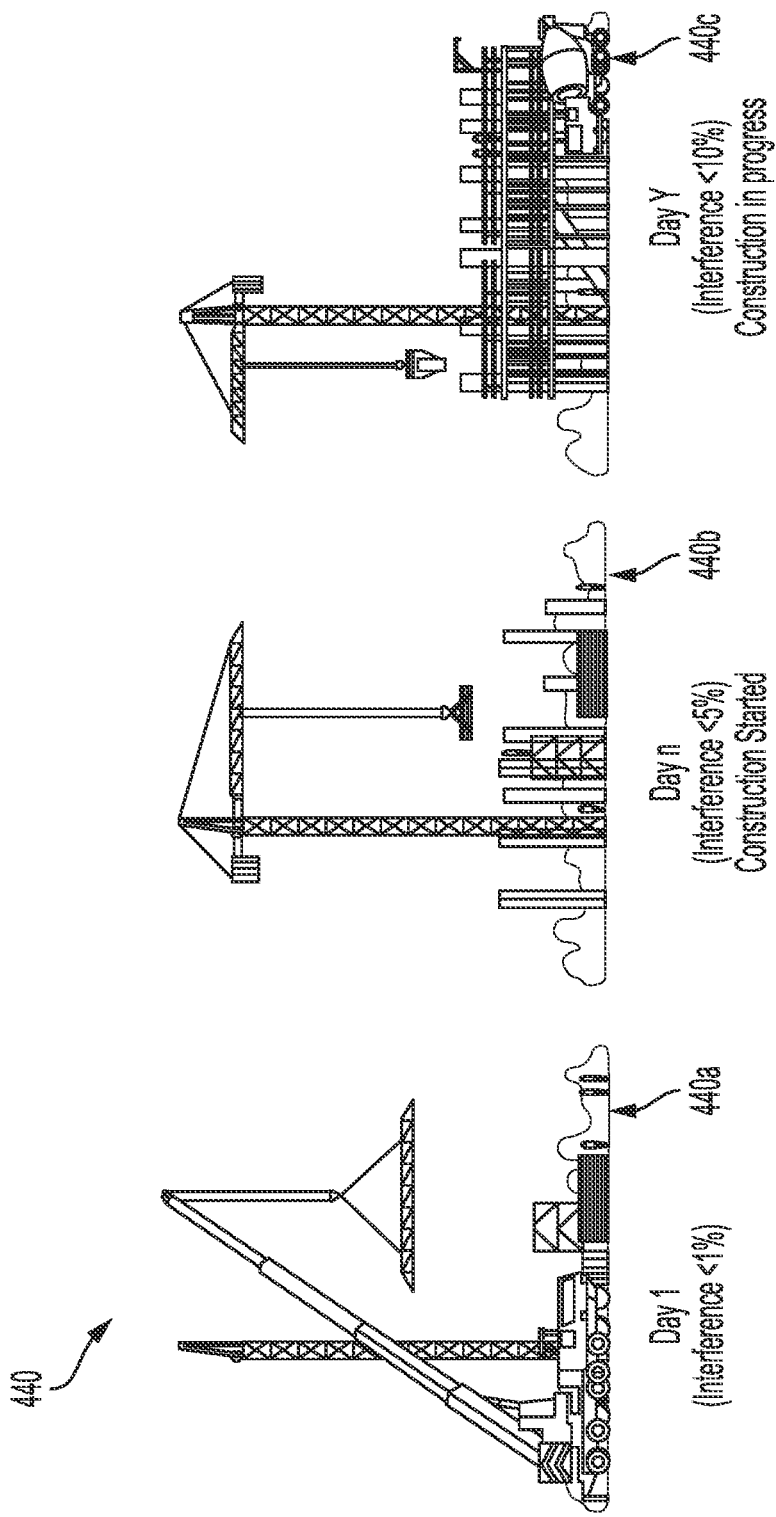

US 11,776,270 B2

TELECOMMUNICATION NETWORK MONITORING

BACKGROUND

The present invention relates generally to a method for monitoring a telecommunication network and in particular to a method and associated system for improving telecommunications and network technology associated with retrieving network transmission location images and attributes, detecting associated obstruction characteristics associated with obstruction objects, and determining an improved transmission location within the telecommunication network.

SUMMARY

A first aspect of the invention provides a telecom network monitoring method comprising: retrieving, by a processor of a hardware device from a plurality of image retrieval devices associated with a plurality of hardware devices connected to a telecom network, images and associated data associated with a transmission location of the telecom network; initializing, by the processor in response to enabling virtual network functions and software agents of the plurality of hardware devices, a special purpose communication channel for enabling transmission of a real time video stream comprising the images with respect to the virtual network functions; enabling, by the processor in response to a user device being enabled, the virtual network functions; locating, by the processor executing a polling software thread, a triggering signal of the virtual network functions; activating, by the processor, domain associated image collector software and hardware components for collecting the images for local cache storage; collecting, by the processor executing MAC based APIs and out of bound APIs, location and activation sight information via the image retrieval devices; collecting, by the processor from a metadata database, object elevation, movement, and abstraction attributes of objects within the images; detecting, by the processor based on the object elevation, movement, and abstraction attributes of objects within the images, obstruction characteristics associated with obstruction objects of the objects located within a coverage area of the telecom network; mapping, by the processor, the obstruction characteristics with login and disturbance patterns of the telecom network; and determining, by the processor based on results of the mapping, an alternative transmission location within the telecom network, wherein the alternative transmission location comprises improved transmissions characteristics with respect to the transmission location.

A second aspect of the invention provides a computer program product, comprising a computer readable hardware storage device storing a computer readable program code, the computer readable program code comprising an algorithm that when executed by a processor of a hardware device implements a telecom network monitoring method, the method comprising: retrieving, by the processor from a plurality of image retrieval devices associated with a plurality of hardware devices connected to a telecom network, images and associated data associated with a transmission location of the telecom network; initializing, by the processor in response to enabling virtual network functions and software agents of the plurality of hardware devices, a special purpose communication channel for enabling transmission of a real time video stream comprising the images with respect to the virtual network functions; enabling, by the processor in response to a user device being enabled, the virtual network functions; locating, by the processor executing a polling software thread, a triggering signal of the virtual network functions; activating, by the processor, domain associated image collector software and hardware components for collecting the images for local cache storage; collecting, by the processor executing MAC based APIs and out of bound APIs, location and activation sight information via the image retrieval devices; collecting, by the processor from a metadata database, object elevation, movement, and abstraction attributes of objects within the images; detecting, by the processor based on the object elevation, movement, and abstraction attributes of objects within the images, obstruction characteristics associated with obstruction objects of the objects located within a coverage area of the telecom network; mapping, by the processor, the obstruction characteristics with login and disturbance patterns of the telecom network; and determining, by the processor based on results of the mapping, an alternative transmission location within the telecom network, wherein the alternative transmission location comprises improved transmissions characteristics with respect to the transmission location.

A third aspect of the invention provides a hardware device comprising a processor coupled to a computer-readable memory unit, the memory unit comprising instructions that when executed by the processor implements a telecom network monitoring method comprising: retrieving, by the processor from a plurality of image retrieval devices associated with a plurality of hardware devices connected to a telecom network, images and associated data associated with a transmission location of the telecom network; initializing, by the processor in response to enabling virtual network functions and software agents of the plurality of hardware devices, a special purpose communication channel for enabling transmission of a real time video stream comprising the images with respect to the virtual network functions; enabling, by the processor in response to a user device being enabled, the virtual network functions; locating, by the processor executing a polling software thread, a triggering signal of the virtual network functions; activating, by the processor, domain associated image collector software and hardware components for collecting the images for local cache storage; collecting, by the processor executing MAC based APIs and out of bound APIs, location and activation sight information via the image retrieval devices; collecting, by the processor from a metadata database, object elevation, movement, and abstraction attributes of objects within the images; detecting, by the processor based on the object elevation, movement, and abstraction attributes of objects within the images, obstruction characteristics associated with obstruction objects of the objects located within a coverage area of the telecom network; mapping, by the processor, the obstruction characteristics with login and disturbance patterns of the telecom network; and determining, by the processor based on results of the mapping, an alternative transmission location within the telecom network, wherein the alternative transmission location comprises improved transmissions characteristics with respect to the transmission location.

The present invention advantageously provides a simple method and associated system capable of accurately monitoring a telecommunication network.

BRIEF DESCRIPTION OF THE DRAWINGS

FIGS. 4A-4D illustrate a telecommunication network obstruction detection and correction process, in accordance with embodiments of the present invention.

DETAILED DESCRIPTION

Figure 1:
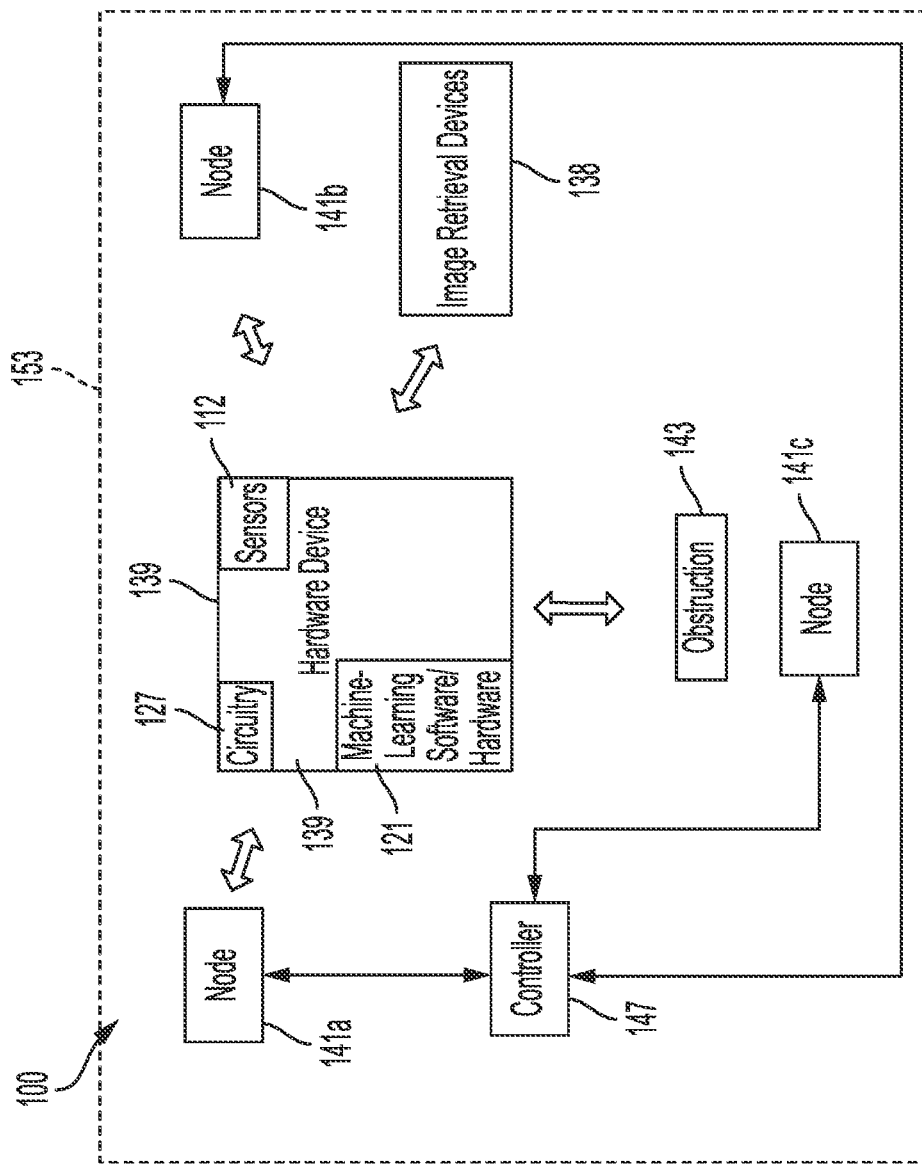
FIG. 1 illustrates a system for improving telecommunications and network technology associated with retrieving network transmission location images and attributes, detecting associated obstruction characteristics associated with obstruction objects, and determining an improved transmission location within the telecommunication network, in accordance with embodiments of the present invention.

FIG. 1 illustrates a system 100 for improving telecommunications and network technology associated with retrieving network transmission location images and attributes, detecting associated obstruction characteristics associated with obstruction objects, and determining an improved transmission location within the telecommunication network, in accordance with embodiments of the present invention. Typical 5G telecom network communications offer real time high-speed data communication facilities that includes an intelligent self-adapting service orchestration and network software framework. 5G network technology typically enables high speed data transfer via a self-organizing network (SON) based autonomic management engine managed within a virtual network function (VNF) layer of a 5G network infrastructure. Associated network optimization techniques typically: present human-based tactical approaches with respect to reactions of a system in view or detect specified events and anomalies with a system being controlled. Increased network infrastructure functionality may be implemented via (machine learning based) artificial intelligence software execution for generating optimal decisions. Current telecommunication systems may be unable to detect radio wave transmission viewable obstructions with respect to predicted target workload patterns. Predicted target workload patterns may be can be determined based on gradually increasing obstruction calculations within a line of sight for an eNodeB (i.e., a transmission enabling hardware/software element of a radio access network). Typical radio access networks include multiple eNodeBs covering each small-cell area. During any user equipment polling cycle, each user equipment device will recognize a signal from all eNodeBs within the associated small cell area and connect to an eNodeB comprising a highest amplitude signal for obtaining better network coverage. Typically, all serving eNodeBs share connection workloads (DTCHs) calculated as packet transmission flow per connection and number of connections created to eNodeB-BTS. When a large solid obstacle interferes with a connection, then a signal strength associated with a respective eNodeB is reduced as associated millimeter waves are unable to penetrate the larger solid objects. During a signal obstruction, peer eNodeBs are configured to take the control of the connection in non-disruptive way as part of a mobility handover process. If the obstacle is temporary, then the aforementioned process functionally operates without performance impact. If the obstacle is permanent, then performance issues may be observed at the additional eNodeBs and the controlling system may be unable to detect an associated workload imbalance for re-adjusting an eNodeB location within a 5G self-healing optimized network. For example, construction project for constructing a tall building is initiated at a location adjacent to a current eNodeB location serving a ⅓ portion of a 5G small cell network. During the construction process, the 5G-eNodeB is unable to sense that the building being constructed will obstruct the eNode connectivity in the future. Likewise, there is no means for generating proactive suggestions (for network healing platforms) using line of sight validation of radio interface. Therefore, during the construction process, there is no way to forecast performance penalties in case the obstruction level increases in future. Furthermore, there is no way to predict future obstruction level increases to ensure correct workload distribution within eNodeBs and associated cells. Therefore, system 100 provides a hardware/software mechanism for generating proactive notifications associated with self-optimized VNF layers for identifying future obstructions and generating proactive action suggestions associated with improved 5G radio interface coverage.

System 100 provides a method, system and apparatus communicating with an eNodeB of a 5G telecom network (e.g., network 153) and accessing future obstacles within a line of sight for radio interface coverage. Accordingly, system 100 is configured to instruct a 5G virtual network function to re-assess and adjust an eNodeB location with respect to consideration of derived artifacts.

System 100 of FIG. 1 includes a hardware device 139 (i.e., specialized hardware), nodes 141a . . . 141c, a controller 147, and image retrieval devices 138 interconnected through a telecom network 153. An obstruction 143 (e.g., a building) is blocking communications between node 141c and hardware device 139. Image retrieval devices 138 may comprise any devices for retrieving images. For example, image retrieval devices 138 may include, cameras, video retrieval devices, etc. Hardware device 139 includes specialized circuitry 127 (that may include specialized software), sensors 112, and machine learning software code/hardware structure 121 (i.e., including machine learning software code). Sensors 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Telecom network 153 may include any type of telecommunication network including, inter alia, a 5G telecom network associated with mobile device communications. Hardware device 139 comprise any type of hardware or software device capable of providing telecom communications and may include, inter alia, mobile phones, software systems, computers, etc. Hardware device 139 may be Bluetooth enabled to provide connectivity to each other and any type of system. Hardware device 139 and controller 147 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139 and controller 147 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving telecommunications and network technology associated with retrieving network transmission location images and attributes, detecting associated obstruction characteristics associated with obstruction objects, and determining an improved transmission location within the telecommunication network.

System 100 is configured to collect correct coverage locations and activation sight information via usage of vision detection cameras located adjacent to an eNodeB. Likewise, system 100 is configured to collect satellite images of respective latitude/longitude locations for associated eNodeBs in combination with altitude information of an eNodeB signal propagator. The aforementioned collected information is used to predict future obstructing entities based on image characterization processes. If a building being constructed or similar larger objects are predicted to potentially obstruct an area of coverage for an eNodeB radio, then a next level anticipation calculation is activated for computing a velocity obstruction and an affected cell region in combination with a reduction in eNodeB login patterns for validating obstructions within a coverage path. Subsequently, a special purpose communication channel DTCH is generated between eNodeB and VNF functions for sharing information insights. The VNF functions are configured to execute ACCEPT_DTCH code for enabling a self-healing network DTCH and the information exchange in enabled with respect to a connected virtual link. Likewise, MAC based communications are established between entities and associated sockets are opened for an eNodeB service instance to send the collected insights. System 100 is further configured to gather Internet situated resource information (e.g., a satellite map) associated with the cells and elevation information. The Internet situated resource information is saved within metadata mapper hardware located at an associated eNodeB. Associated object and attribute information is extracted from eNodeB image collectors mounted on a signaling transceiver and a nature of object movement and obstruction level is identified. Associated levels are gathered and shared with the VNF functions for generating a self-optimization and relocation decision.

Determined obstacle characteristics and location coordinates are mapped with eNodeB login patterns and associated disturbance attributes are pushed to a VNF instance for further processing. For example, if an eNodeB is mounted at a specified location and an image collector and exactor locate a building construction in progress, then the aforementioned mapped information is transferred to the VNF instance with recognized obstacle information and login information is monitored. When the mapped information is received by the VNF instance, then a satellite map with respect to respective coordinates is recorded and re-validated for building construction. Based on the derived artifacts, the VNF instance transmits instructions for relocating a location for the eNodeB for better coverage.

System 100 is enabled to provide a suggestion for an improved location for the eNodeB for regional coverage. Nearby suitable locations are selected via image processing techniques and improved locations are recognized based on a latitude and longitude and object height extraction attributes. A VNF service presents a probable next location of an eNodeB when a current location is insufficient to cover a cell. Self-repair and optimized network processes are enabled by system 100. Execution of the aforementioned processes enable retrieval of proactive information for coverage reduction and identification of a next suitable location of an eNodeB for better communications coverage thereby enabling network providers to offer seamless connectivity via proactively identifying low-lights and gains associated with a balanced network configured for congestion avoidance.

Figure 2:
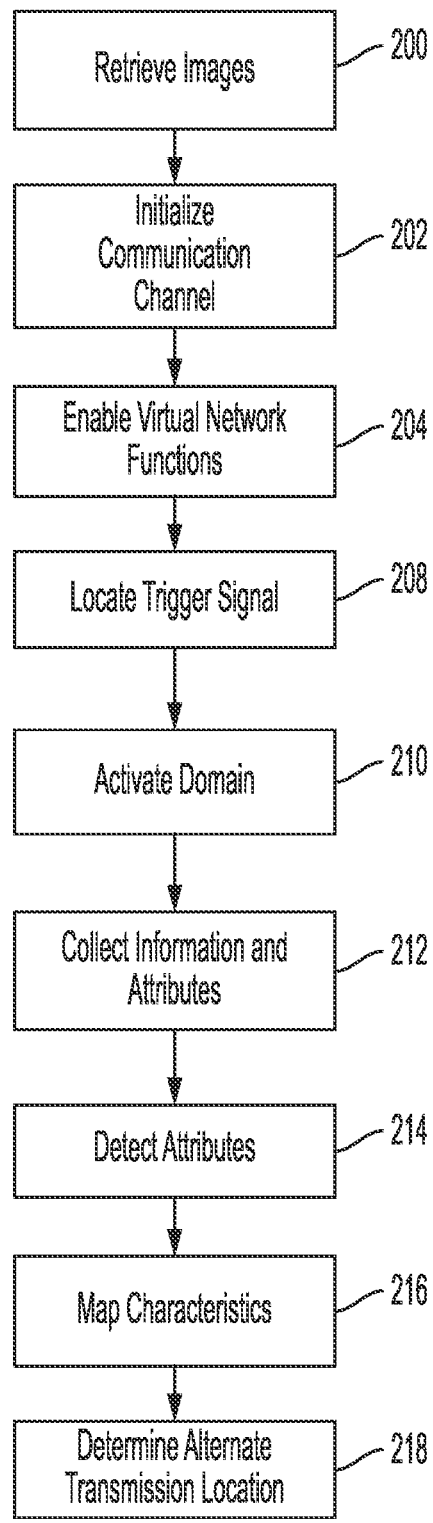
FIG. 2 illustrates an algorithm detailing a process flow enabled by the system of FIG. 1 for improving telecommunications and network technology associated with retrieving network transmission location images and attributes, detecting associated obstruction characteristics associated with obstruction objects, and determining an improved transmission location within the telecommunication network, in accordance with embodiments of the present invention.

FIG. 2 illustrates an algorithm detailing a process flow enabled by system 100 of FIG. 1 for improving telecommunications and network technology associated with retrieving network transmission location images and attributes, detecting associated obstruction characteristics associated with obstruction objects, and determining an improved transmission location within the telecommunication network, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed by hardware device 139 and/or controller 147 of FIG. 1. In step 200, images and associated data associated with a transmission location of telecom network are retrieved (by a hardware device) via image retrieval devices connected to the telecom network. The telecom network may include, inter alia, an eNodeB 5G telecom network. Retrieving the images and associated data may include:

1. Registering an agent device of the hardware device for specialized capability within the telecom network.
2. Collecting an identity and a geolocation associated with the telecom network.
3. Enabling the MAC based APIs and out of bound APIs for authentication functionality.

In step 202, a special purpose communication channel is initialized in response to enabling virtual network functions and software agents. The special purpose communication channel is configured to for enable transmission of a real time video stream including the images with respect to the virtual network functions. In step 204, the virtual network functions are enabled in response to a user device being enabled. In step 208, a triggering signal of the virtual network functions is located via execution of a polling software thread. In step 210, domain associated image collector software and hardware components are activated for collecting said images for local cache storage. Activating the domain associated image collector software and hardware components may include:

1. Transmitting (via stream-based transmission) said images to a virtual network function instance of the virtual network functions.
2. Storing results of the transmitting.

In step 212, location and activation sight information is collected (via execution of MAC based APIs and out of bound APIs) via the image retrieval devices. Additionally, object elevation, movement, and abstraction attributes of objects within the images are collected from a metadata database. Collecting the location and activation sight information may include:

1. Retrieving supplementary data from satellite images of the images.
2. Capturing altitude data of the telecom network via execution of mapping software with respect to the data from the satellite images.
3. Determining future obstructions associated with the telecom network.

In step 214, obstruction characteristics are detected based on the object elevation, movement, and abstraction attributes of objects within the images. The obstruction characteristics are associated with obstruction objects of the objects located within a coverage area of the telecom network. Detecting the obstruction characteristics may include determining velocity obstruction characteristics and reduced login patterns of the telecom network with respect to the obstruction objects. In step 216, the obstruction characteristics are mapped with login and disturbance patterns of the telecom network. Mapping the obstruction characteristics may include generating a historical map associated with the obstruction objects. In step 218, an alternative transmission location within the telecom network is determined based on results of the mapping of step 216. The alternative transmission location comprises improved transmissions characteristics with respect to the transmission location. Determining the alternative transmission location may include:

1. Detecting multiple transmission locations of the telecom network.
2. Selecting the alternative transmission location from the multiple transmission locations.

Figure 3:
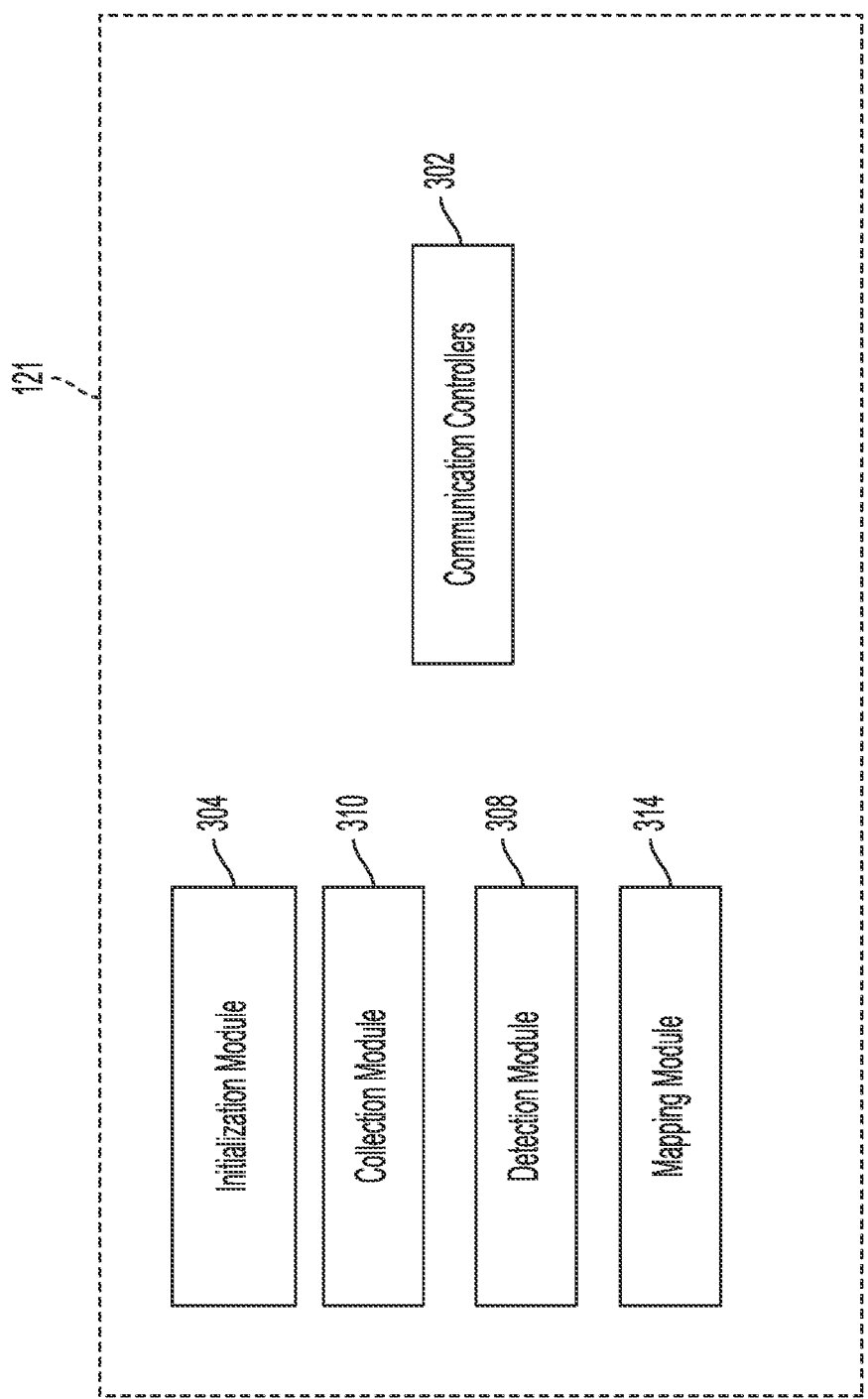
FIG. 3 illustrates an internal structural view of the machine learning software/hardware structure and/or the circuitry of FIG. 1, in accordance with embodiments of the present invention.

FIG. 3 illustrates an internal structural view of machine learning software/hardware structure 121 (and/or circuitry 127) of FIG. 1, in accordance with embodiments of the present invention. Machine learning software/hardware structure 121 includes an initialization module 304, a collection module 310, a detection module 308, a mapping module 314, and communication controllers 302. Initialization module 304 comprises specialized hardware and software for controlling all functions related to the initialization steps of FIGS. 1 and 2. Collection module 310 comprises specialized hardware and software for controlling the collection steps for implementing the process described with respect to the algorithm of FIG. 2. Detection module 308 comprises specialized hardware and software for controlling all functions related to the attribute detection steps of FIG. 2. Mapping module 314 comprises specialized hardware and software for controlling all functions related mapping processes as described, supra. Communication controllers 302 are enabled for controlling all communications between initialization module 304, collection module 310, detection module 308, and mapping module 314.

FIGS. 4A-4D illustrate a telecommunication network obstruction detection and correction process, in accordance with embodiments of the present invention.

Figure 4A:
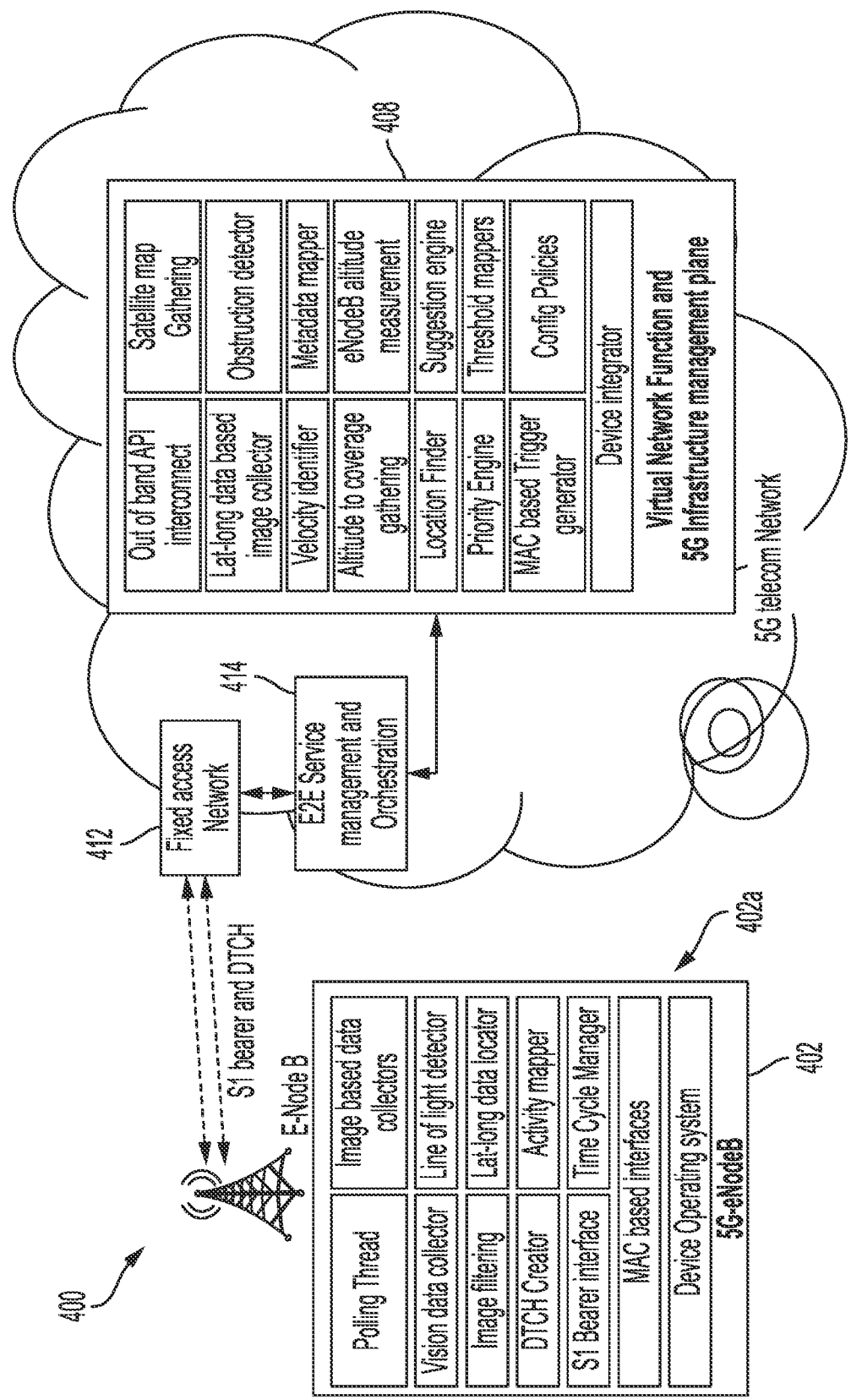

FIG. 4A illustrates a 5G telecom network 400. 5GB telecom network 400 comprises an eNodeB function component 402 connected to a VNF management hardware/software layer 408 via a fixed access network 412and a service management component 414. eNodeB function component 400 comprises an agent daemon comprising a software component that collects information from video retrieval devices (e.g., a camera) via various resource components situated across multiple eNodeB function components. A self-optimization module (associated with eNodeB function component 402) is activated with respect to VNF management hardware/software layer 408 hardware/software layer. Likewise (upon initialization of an agent device), eNodeB function component 402 communicates with a VNF instance for executing a self-registering to enable specializer capability with respect to an associated eNodeB in within a specified cell. Subsequently, a service orchestration component collects an eNodeB identity and retrieves a geo specific location of the eNodeB with respect to usage of a location mapper to execute a respective eNodeB instance. Likewise, in-bound or out-of-bound service infrastructure management application programming instances (APIs) are invoked to transfer relevant authentication and location driven information from an eNodeB that collects MAC based commination frames across entities.

Figure 4B:
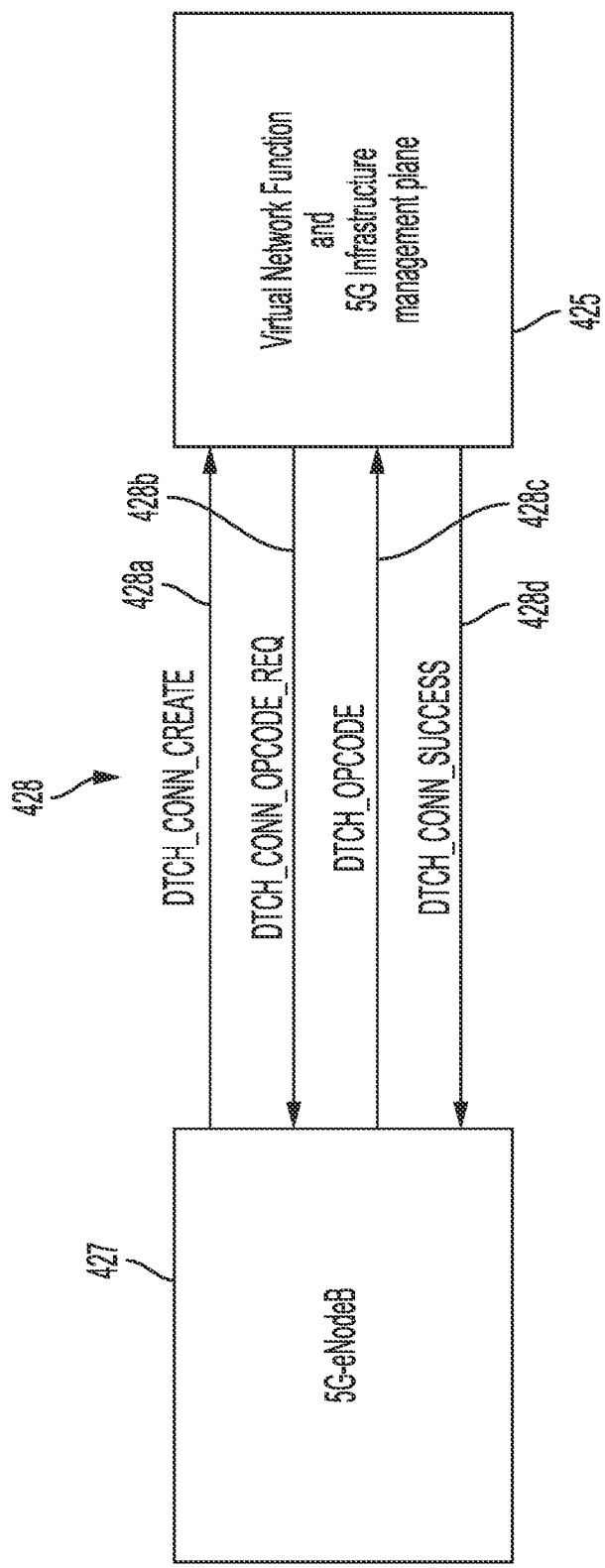

FIG. 4B illustrates an internal view of a connect request sequence 428 of the 5G telecom network 400 of FIG. 4A. Connect request sequence 428 initiates (in response to enabling a VNF instance 425 connected to an eNodeB agent 427) a special purpose communication channel of eNodeB agent 427for transmission of a real time video stream (comprising line of sight image data) to VNF instance 425. Connect request sequence 428 comprises a DTCH_CONNECT request 428a, a DTCH_CONN_OPCODE response 428b, a DTCH_OPCODE request 428c, and a DTCH_CONN_SUCCESS response 428d. The transmission process is initiated when DTCH_CONNECT request 428a is transmitted by eNodeB 427 via a S-GW to VNF instance 425. In response, DTCH_CONN_OPCODE response 428b communicates with VNF instance 425 to determine a DTCH type for initiating the (new) special purpose communication channel. Subsequently, DTCH_OPCODE request 428c (pre-determined via the 5G implementation) is exchanged to indicate a special purpose network-self-optimization channel. Associated data transmitted via a MAC. In response, VNF instance 425 allocates memory (PAGES), determines resources at an edged cloud, and adds the a UUID (for the special purpose network-self-optimization channel) to an activation list. Subsequently, information negotiated parameters and DTCH_CONNECT_SUCCESS response 428d is shared with eNodeB agent 427 to indicate further data transmission tunnel creation between 5G devices using a special purpose 5G-channel. In response to DTCH_CONNECT_SUCCESS response 428d, a service instance is initiated when a user end (UE) device is initiated and registers activation attributes with the service instance within a 5G-plane and a DTCH_UUID is detected within an activation list via a VNF polling thread. Subsequently, stream data collectors are initiated for collecting stream data after a pre-defined time interval. An associated interval definition is collected from static configuration files defining a common set of global parameters for data collection triggering for eNodeB agent 427. When the service instance (within VNF instance 425) detects a data collection cycle, a trigger is supplied to each eNodeB agent within the service instance to validate a connectivity and obstruction level. eNodeB agent 427 comprises a polling thread for locating a trigger SIGNAL from VNF instance 425. When the TRIGGER signal is detected, a supplementary data collection process is initiated via an eNodeB daemon instance.

Figure 4C:
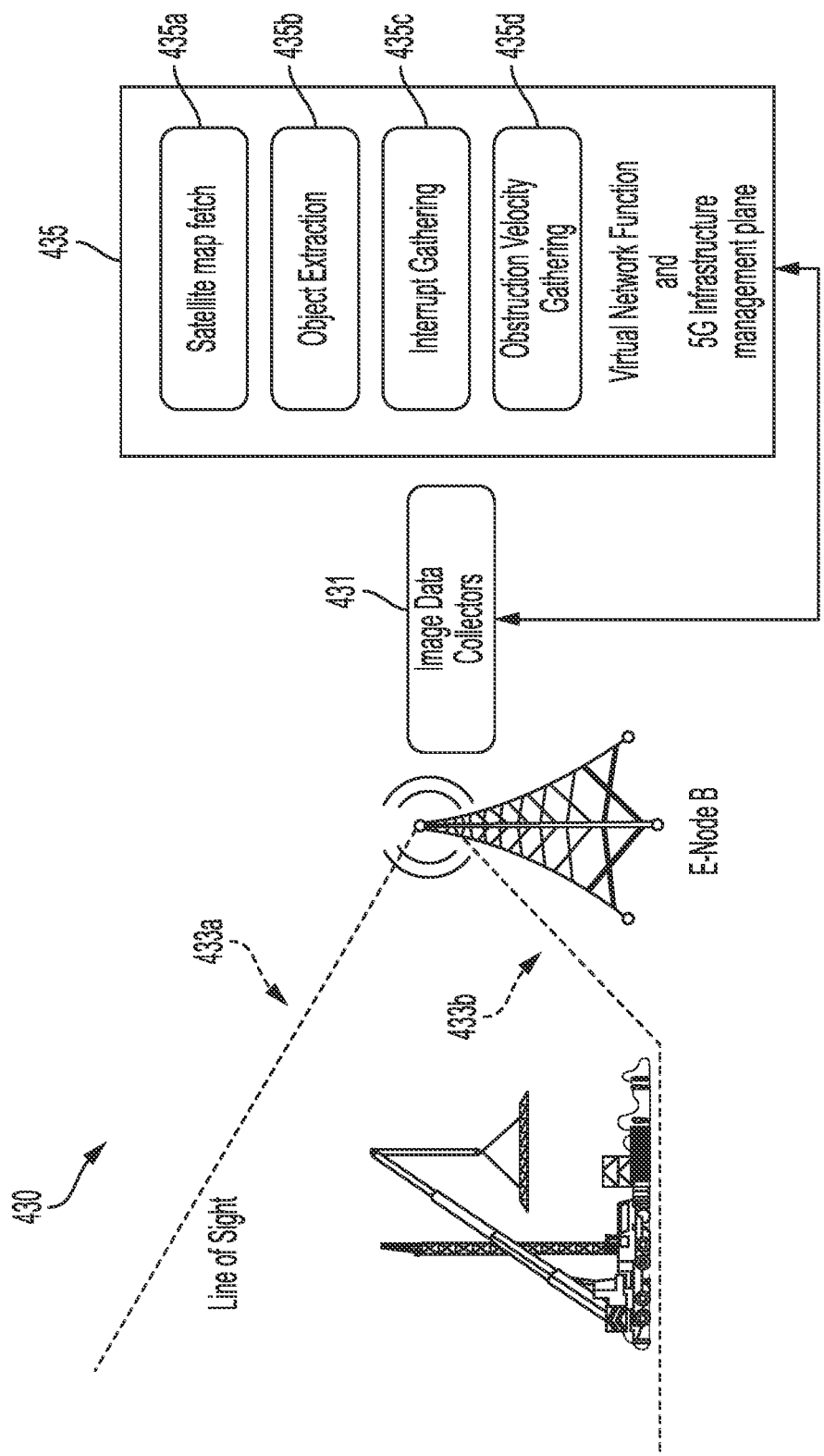

FIG. 4C illustrates a 5G telecom network line of sight obstruction detection process 430. The process is initiated when image data collectors 431 are activated for retrieving image data from line of sight regions 433a and 433b. The image data may be saved within a local data cache. Additionally, the image data is transmitted to a VNF instance 435 via usage of a stream-based transmitting process associated with an S1 bearer component. The image data collected by VNF instance 435 is stored by a metadata mapper component of VNF instance 435. The image data is used for further processing and obstruction analysis. VNF instance 435 is configured to invokes in-bound MAC based APIs and out-of-bound APIs to collect locations and activation sight information (in response to execution of a satellite map component 435a, an object extraction component 435b, an interrupt gathering component 435c, and an obstruction velocity gathering component 435d of VNF instance 435) via usage of vision detection cameras situated via the 5G network. Internet situated resources are injected into the process to retrieve (via satellite map component 435a) supplementary information from satellite images from respective latitude-longitude locations. Altitude information of from an eNodeB signal propagator is captured using map-based relevance mapping from satellite information of the satellite images. Associated information from saved historical cyclic image datasets for a same eNodeB agent is mapped (with respect to time) and an object elevation, movement, and abstraction level is collected from metadata storage. Each time, line of sight information is collected, the eNodeB is polled for login attributes and associated workload allocation metrics saved within an object library associated with VNF functions. Future obstructing entities are anticipated based on the image characterization using leaner regression model with respect to object movement, elevation and other attribute validations.

FIG. 4D illustrates an example of a sequential 5G telecom network obstruction detection process 440. The example illustrated in FIG. 4D is associated with differing obstruction interference percentages (for different phases 440a . . . 440c) of a construction process associated with the construction of a building located between a coverage area for an eNodeB transmitter. The process is initiated when a next level of anticipation calculation is activated for computing a velocity obstruction and affected cell regions in combination with a reduction in eNodeB login patterns to validate obstructions within a coverage path. Subsequently, obstacle characteristics and location coordinates (associated with a detected obstruction) are determined mapped with the eNodeB login patterns and associated disturbance attributes. The mapped results are transmitted to a mapping database for building a history map of the obstruction. For example, if an eNodeB transmitter is mounted at a specified location and an image collector and exactor locates a building construction process in progress, the history map is transferred to an associated VNF instance with recognized obstacle information (e.g., residential building) and login reduction characteristics are monitored and a telecom network node rerouting process is executed. When the aforementioned processes of FIGS. 4A-4D have detected that current or future obstructions (associated with transmission between eNodeB agents) are increasing within a line of sight area 452 an action is executed for locating a better cell coverage location for activating an eNodeB instance. Likewise, latitude-longitude information is used to retrieve localized suitable locations for selection via existing image processing techniques and improved locations are acknowledged. Based on the latitude-longitude information and object height extraction information, a VNF service is configured to offer a probable next location for an eNodeB instance for providing a better location when a current location is insufficient to cover an associated transmission cell. Associated information is pushed to a designated network operator and authorities based on a subscription and accordingly associated decisions may be determined proactively before an actual failure of signaling strengths occurs.

Figure 5:
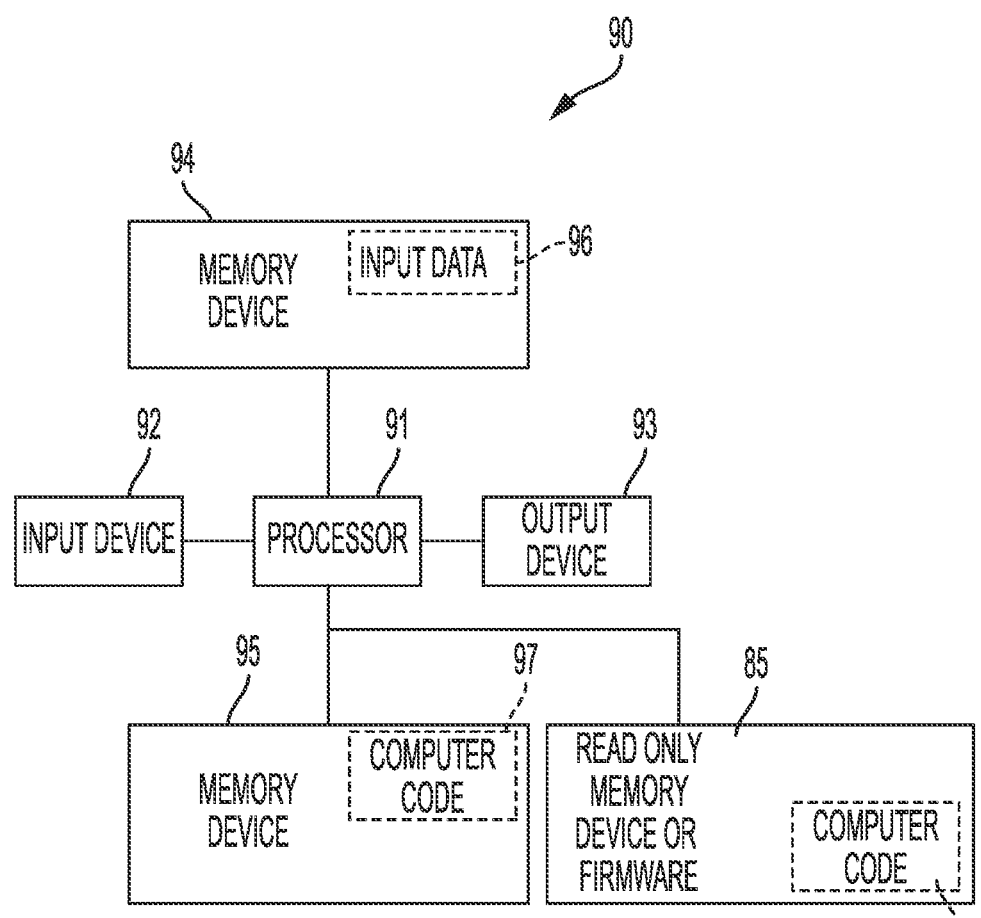
FIG. 5 illustrates a computer system used by the system of FIG. 1 for improving telecommunications and network technology associated with retrieving network transmission location images and attributes, detecting associated obstruction characteristics associated with obstruction objects, and determining an improved transmission location within the telecommunication network, in accordance with embodiments of the present invention.

FIG. 5 illustrates a computer system 90 (e.g., hardware device 139 of FIG. 1) used by or comprised by the system of FIG. 1 for improving telecommunications and network technology associated with retrieving network transmission location images and attributes, detecting associated obstruction characteristics associated with obstruction objects, and determining an improved transmission location within the telecommunication network, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving telecommunications and network technology associated with retrieving network transmission location images and attributes, detecting associated obstruction characteristics associated with obstruction objects, and determining an improved transmission location within the telecommunication network. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve telecommunications and network technology associated with retrieving network transmission location images and attributes, detecting associated obstruction characteristics associated with obstruction objects, and determining an improved transmission location within the telecommunication network. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving telecommunications and network technology associated with retrieving network transmission location images and attributes, detecting associated obstruction characteristics associated with obstruction objects, and determining an improved transmission location within the telecommunication network. In another embodiment, the invention provides a business method that performs the process steps of the invention on a subscription, advertising, and/or fee basis. That is, a service supplier, such as a Solution Integrator, could offer to enable a process for improving telecommunications and network technology associated with retrieving network transmission location images and attributes, detecting associated obstruction characteristics associated with obstruction objects, and determining an improved transmission location within the telecommunication network. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
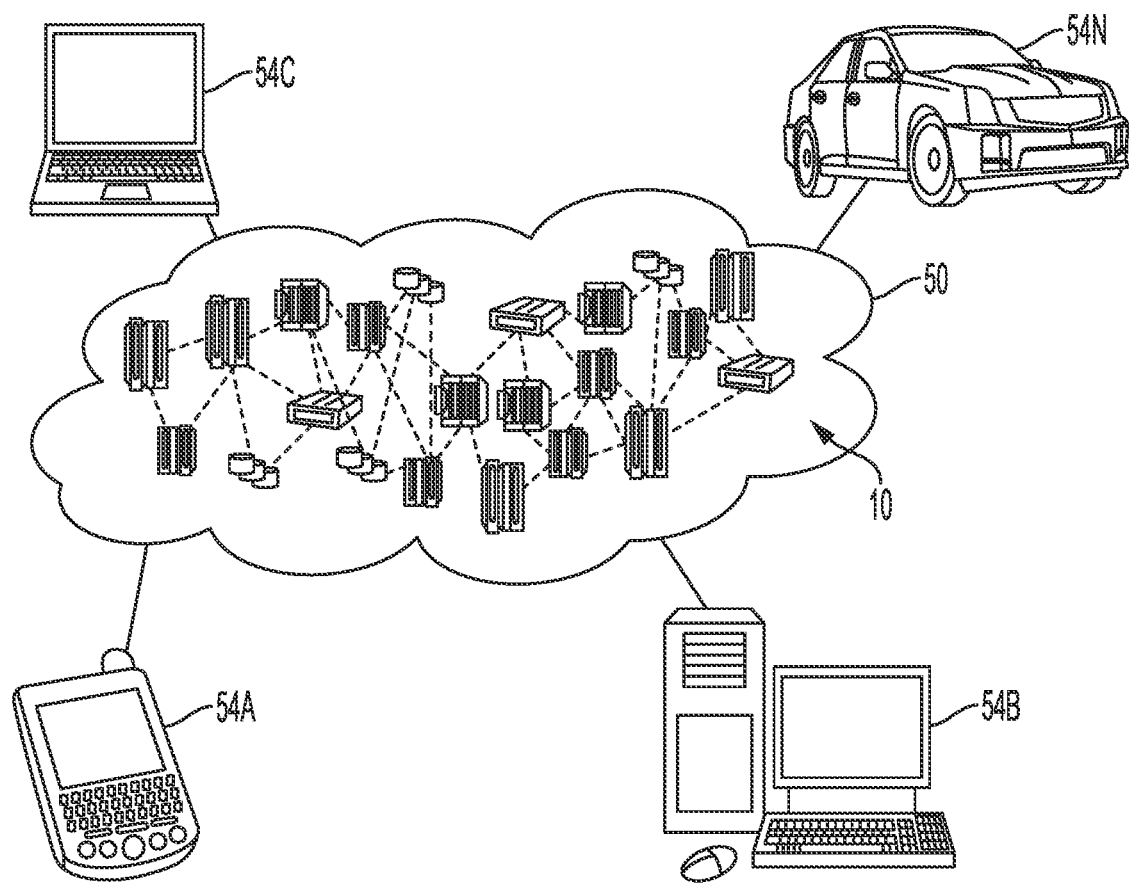
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
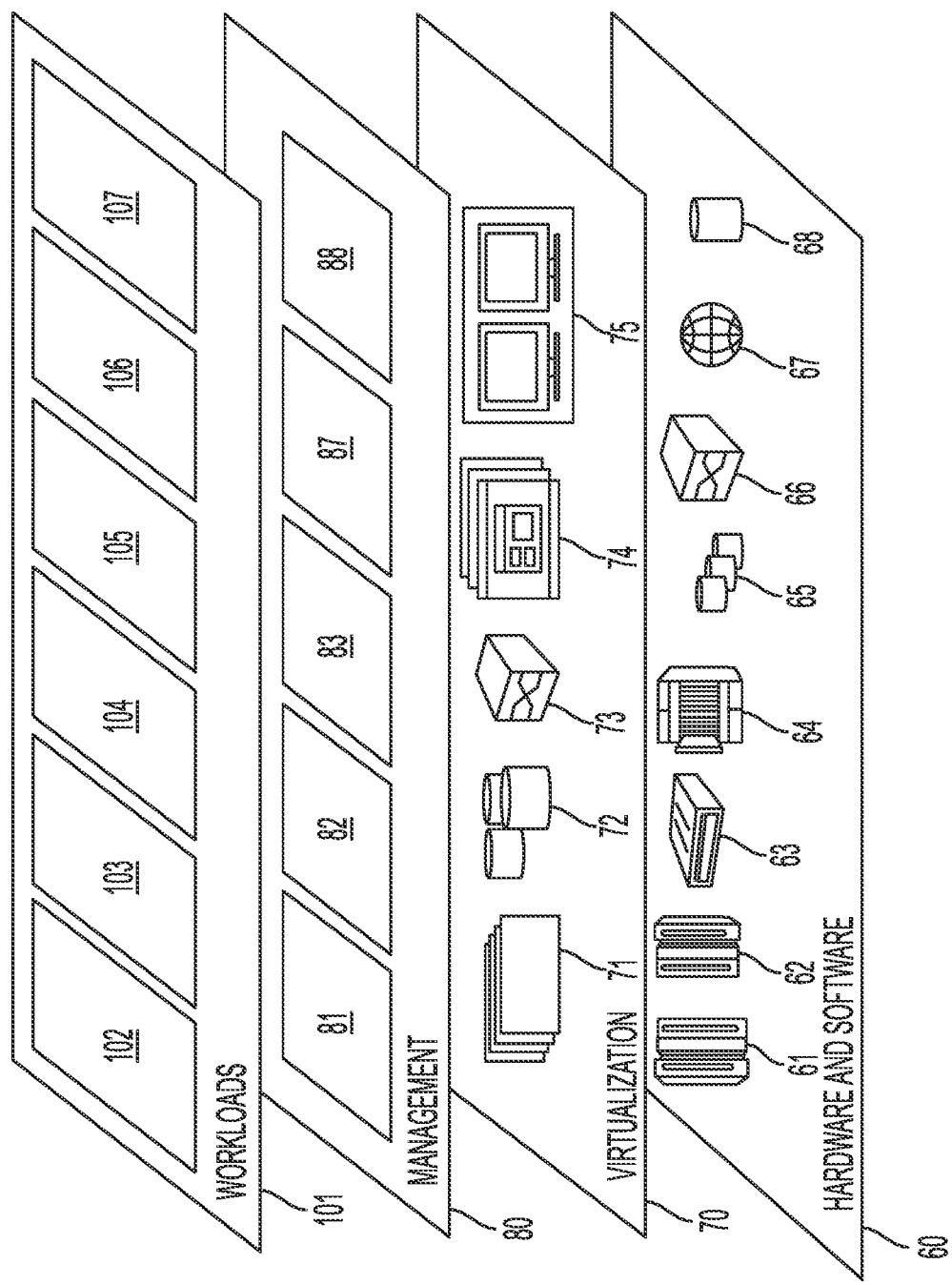
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving telecommunications and network technology associated with retrieving network transmission location images and attributes, detecting associated obstruction characteristics associated with obstruction objects, and determining an improved transmission location within the telecommunication network 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A telecom network monitoring method comprising:
retrieving, by a processor of a hardware device from a plurality of image retrieval devices associated with a plurality of hardware devices connected to a telecom network, images and associated data associated with a transmission location of said telecom network;
initializing, by said processor in response to enabling virtual network functions and software agents of said plurality of hardware devices, a special purpose communication channel for enabling transmission of a real time video stream comprising said images with respect to said virtual network functions;
enabling, by said processor in response to a user device being enabled, said virtual network functions;
locating, by said processor executing a polling software thread, a triggering signal of said virtual network functions;
activating, by said processor, domain associated image collector software and hardware components for collecting said images for local cache storage;
collecting, by said processor executing MAC based APIs and out of bound APIs, location and activation sight information via said image retrieval devices;
collecting, by said processor from a metadata database, object elevation, movement, and abstraction attributes of objects within said images;
detecting, by said processor based on said object elevation, movement, and abstraction attributes of objects within said images, obstruction characteristics associated with obstruction objects of said objects located within a coverage area of said telecom network;
mapping, by said processor, said obstruction characteristics with login and disturbance patterns of said telecom network; and
determining, by said processor based on results of said mapping, an alternative transmission location within said telecom network, wherein said alternative transmission location comprises improved transmissions characteristics with respect to said transmission location.

2. The method of claim 1, wherein said telecom network comprises an eNodeB 5G telecom network.

3. The method of claim 1, wherein said retrieving said images and associated data comprises:

registering an agent device of said hardware device for specialized capability within said telecom network;

collecting an identity and a geolocation associated with said telecom network; and enabling said MAC based APIs and out of bound APIs for authentication functionality.

4. The method of claim 1, wherein said activating said domain associated image collector software and hardware components comprises:

transmitting, via stream-based transmission, said images to a virtual network function instance of said virtual network functions; and storing results of said transmitting.

5. The method of claim 1, wherein said collecting said location and activation sight information comprises:

retrieving supplementary data from satellite images of said images; and capturing altitude data of said telecom network via execution of mapping software with respect to said data from said satellite images.

6. The method of claim 1, wherein said collecting said object elevation, movement, and abstraction attributes comprises:

determining future obstructions associated with said telecom network.

7. The method of claim 1, wherein said detecting said obstruction characteristics comprises:

determining velocity obstruction characteristics and reduced login patterns of said telecom network with respect to said obstruction objects.

8. The method of claim 1, wherein said mapping said obstruction characteristics comprises:

generating a historical map associated with said obstruction objects.

9. The method of claim 1, wherein said determining said alternative transmission location comprises:

detecting multiple transmission locations of said telecom network; and selecting said alternative transmission location from said multiple transmission locations.

10. The method of claim 1, further comprising:

providing at least one support service for at least one of creating, integrating, hosting, maintaining, and deploying computer-readable code in the hardware device, said code being executed by the computer processor to implement: said retrieving, said initializing, said enabling, said locating, said activating, said collecting said location and activation sight information, said collecting said object elevation, movement, and abstraction attributes, said detecting, said mapping, and said determining.

11. A computer program product, comprising a computer readable hardware storage device storing a computer readable program code, said computer readable program code comprising an algorithm that when executed by a processor of a hardware device implements a telecom network monitoring method, said method comprising:

retrieving, by said processor from a plurality of image retrieval devices associated with a plurality of hardware devices connected to a telecom network, images and associated data associated with a transmission location of said telecom network;

initializing, by said processor in response to enabling virtual network functions and software agents of said plurality of hardware devices, a special purpose communication channel for enabling transmission of a real time video stream comprising said images with respect to said virtual network functions;

enabling, by said processor in response to a user device being enabled, said virtual network functions;

locating, by said processor executing a polling software thread, a triggering signal of said virtual network functions;

activating, by said processor, domain associated image collector software and hardware components for collecting said images for local cache storage;

collecting, by said processor executing MAC based APIs and out of bound APIs, location and activation sight information via said image retrieval devices;

collecting, by said processor from a metadata database, object elevation, movement, and abstraction attributes of objects within said images;

detecting, by said processor based on said object elevation, movement, and abstraction attributes of objects within said images, obstruction characteristics associated with obstruction objects of said objects located within a coverage area of said telecom network;

mapping, by said processor, said obstruction characteristics with login and disturbance patterns of said telecom network; and determining, by said processor based on results of said mapping, an alternative transmission location within said telecom network, wherein said alternative transmission location comprises improved transmissions characteristics with respect to said transmission location.

12. The computer program product of claim 11, wherein said telecom network comprises an eNodeB 5G telecom network.

13. The computer program product of claim 11, wherein said retrieving said images and associated data comprises:

registering an agent device of said hardware device for specialized capability within said telecom network;

collecting an identity and a geolocation associated with said telecom network; and enabling said MAC based APIs and out of bound APIs for authentication functionality.

14. The computer program product of claim 11, wherein said activating said domain associated image collector software and hardware components comprises:

transmitting, via stream-based transmission, said images to a virtual network function instance of said virtual network functions; and storing results of said transmitting.

15. The computer program product of claim 11, wherein said collecting said location and activation sight information comprises:

retrieving supplementary data from satellite images of said images; and capturing altitude data of said telecom network via execution of mapping software with respect to said data from said satellite images.

16. The computer program product of claim 11, wherein said collecting said object elevation, movement, and abstraction attributes comprises:

determining future obstructions associated with said telecom network.

17. The computer program product of claim 11, wherein said detecting said obstruction characteristics comprises:

determining velocity obstruction characteristics and reduced login patterns of said telecom network with respect to said obstruction objects.

18. The computer program product of claim 11, wherein said mapping said obstruction characteristics comprises:
  generating a historical map associated with said obstruction objects.

19. The computer program product of claim 11, wherein said determining said alternative transmission location comprises:
  detecting multiple transmission locations of said telecom network; and
  selecting said alternative transmission location from said multiple transmission locations.

20. A hardware device comprising a processor coupled to a computer-readable memory unit, said memory unit comprising instructions that when executed by the processor implements a telecom network monitoring method comprising:
  retrieving, by said processor from a plurality of image retrieval devices associated with a plurality of hardware devices connected to a telecom network, images and associated data associated with a transmission location of said telecom network;
  initializing, by said processor in response to enabling virtual network functions and software agents of said plurality of hardware devices, a special purpose communication channel for enabling transmission of a real time video stream comprising said images with respect to said virtual network functions;
  enabling, by said processor in response to a user device being enabled, said virtual network functions;
  locating, by said processor executing a polling software thread, a triggering signal of said virtual network functions;
  activating, by said processor, domain associated image collector software and hardware components for collecting said images for local cache storage;
  collecting, by said processor executing MAC based APIs and out of bound APIs, location and activation sight information via said image retrieval devices;
  collecting, by said processor from a metadata database, object elevation, movement, and abstraction attributes of objects within said images;
  detecting, by said processor based on said object elevation, movement, and abstraction attributes of objects within said images, obstruction characteristics associated with obstruction objects of said objects located within a coverage area of said telecom network;
  mapping, by said processor, said obstruction characteristics with login and disturbance patterns of said telecom network; and
  determining, by said processor based on results of said mapping, an alternative transmission location within said telecom network, wherein said alternative transmission location comprises improved transmissions characteristics with respect to said transmission location.

* * * * *